United States Patent [19]

Ruppel et al.

[11] Patent Number: 5,737,705
[45] Date of Patent: Apr. 7, 1998

[54] METHOD AND APPARATUS FOR FREQUENCY ASSIGNMENT OF A BASE STATION

[75] Inventors: John Stephen Ruppel, North Richland Hills; John Douglas Reed, Arlington, both of Tex.

[73] Assignee: Motorola, Inc., Schaumburg, Ill.

[21] Appl. No.: 395,670

[22] Filed: Feb. 28, 1995

[51] Int. Cl.$^6$ .............................. H04B 7/26; H04B 17/02
[52] U.S. Cl. .................. 455/452; 455/62; 455/63
[58] Field of Search .................... 379/60; 455/33.2, 455/34.1, 54.1, 62, 63, 450, 451, 452, 453, 436

[56] References Cited

U.S. PATENT DOCUMENTS

| 5,212,831 | 5/1993 | Chuang et al. | 455/54.1 |
|---|---|---|---|
| 5,483,666 | 1/1996 | Yamada et al. | 455/33.1 |
| 5,491,837 | 2/1996 | Haartsen | 455/62 |

FOREIGN PATENT DOCUMENTS

| 2-224424 | 9/1990 | Japan | 455/34.1 |
|---|---|---|---|
| 2268857 | 1/1994 | United Kingdom | 455/34.1 |
| 2269298 | 2/1994 | United Kingdom | 455/62 |

OTHER PUBLICATIONS

J. C–I Chuang, "Autonomouds Adaptive Frequency Assignment for TDMA Portable Radio Systems", Fourth Nordic Seminar on Digital Mobile Radio Communications, Jun. 26–28, 1990, Oslo, Norway, Paper 9.2.

J. C–I Chuang, "Operation and Performance of a Self–Organizing Frequency Assignment Method for TDMA Portable Radio", IEEE Globecom '90, San Diego, CA, Dec. 2–5, 1990, pp. 1548–1552.

J. C–I Chuang, "Autonomous Frequency Assignment and Access for TDMA Personal Portable Radio Communications", IEEE VTC '91, St. Louis, MO, May 19–22, 1991.

Donald Cox and Douglas Reudink, "A Comparison of Some Channel Assignment Strategies in Large–Scale Mobile Communications Systems", IEEE Transactions on Communications, Apr. 1972, pp. 190–195.

"Appendix A—Automatic Port Frequency Assignment", JTC(AIR)/94.02.07–119R5, Aug. 25, 1994, pp. 209–211.

*Primary Examiner*—Reinhard J. Eisenzopf
*Assistant Examiner*—Lester G. Kincaid
*Attorney, Agent, or Firm*—Bruce Terry

[57] ABSTRACT

A method for improved frequency assignment includes recording communications events (130), for example handoff statistics, for subscriber units handing to and away from a base station (931). The handoff statistics include the IDs of the other base stations (932–937) involved in the handoff, preferably along with the date and time of the handoff. The statistics of the handoff count are applied based on the number of occurrences within a time period (140), and are used to accept or reject the potential frequency assignments obtained from an assignment process. In one embodiment of this process, using a Q estimate, obtained from residual powers recorded on each frequency (430–435), a candidate frequency is chosen based on the lowest Q value (440). This candidate is tested against the handoff statistics, and if rejected, a frequency with the next lowest Q level is tested (450–470). This process is repeated until a frequency is assigned.

20 Claims, 6 Drawing Sheets

120

130

500

600

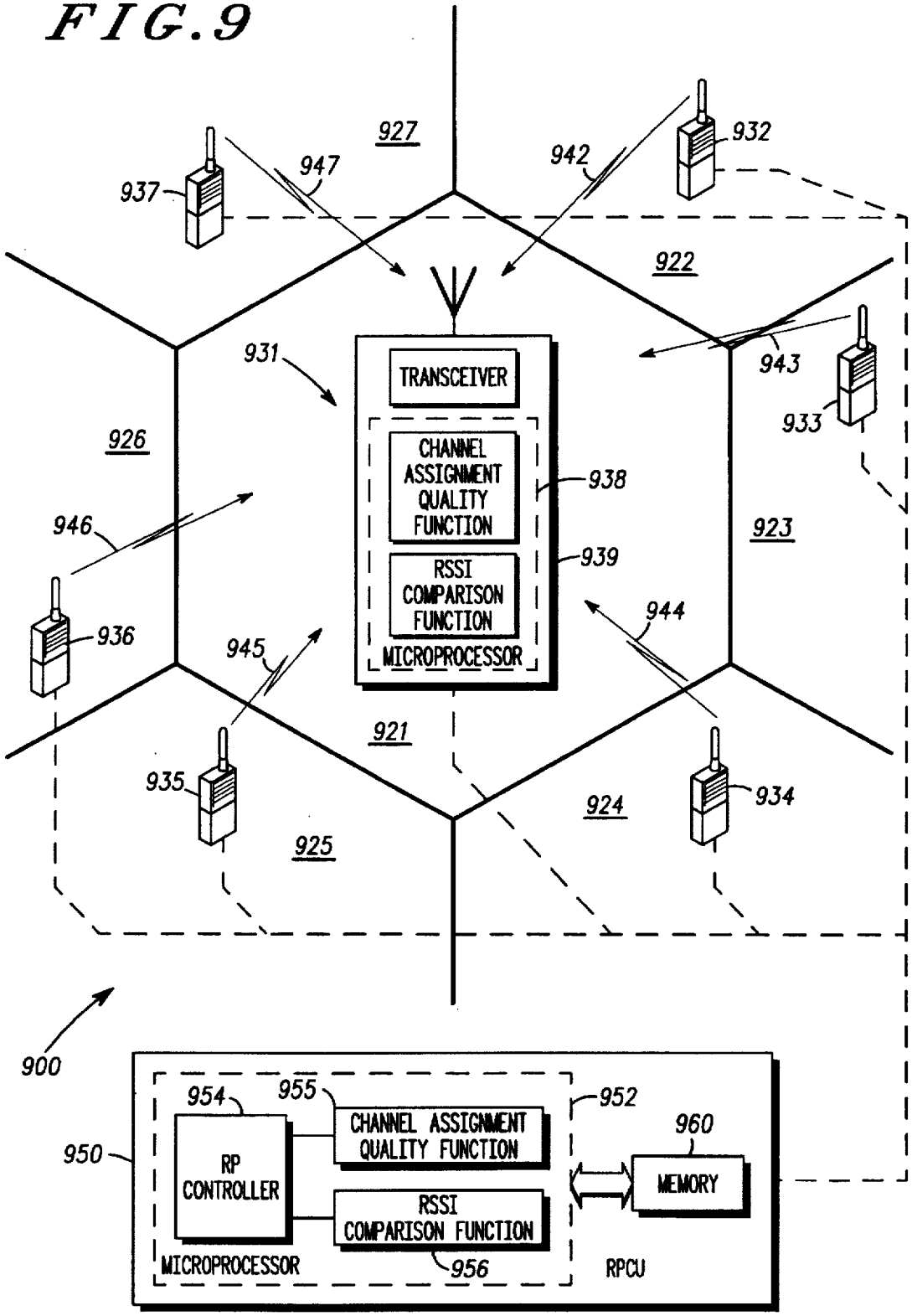

METHOD AND APPARATUS FOR FREQUENCY ASSIGNMENT OF A BASE STATION

FIELD OF THE INVENTION

The present invention relates, in general, to communication systems and, more particularly, to a method and apparatus for assigning an operating frequency of a communication unit of a communication system.

BACKGROUND OF THE INVENTION

In a wireless communication system which makes use of small, low power base stations mounted generally below the local building clutter, the coverage area is limited due to the physical propagation environment. Thus to cover a wide area, potentially thousands of small base stations are required, each providing coverage to an area whose size and shape is influenced by the locations of buildings, trees, foliage, terrain, and various other environmental components (for example, see coverage area 720 of FIG. 7.) A secondary requirement for such a communication system is for the frequency assigned to each base station have sufficient reuse distance from another base using the same frequency such that the signal level from one of these co-channel base stations is below a predefined maximum level in the coverage area of the other, since the signal will interfere with the reception of the desired signal by a subscriber in the coverage area. The ratio of the desired signal power received at a receiver, to the sum of the powers from all the co-channel users is called the co-channel carrier to interference (C/I) ratio and is normally expressed in decibels (dB). Typically this C/I ratio is set to around 17–20 dB for analog FM and for some digital modulations, and this number is used as a minimum required level over 90% of the coverage area of a base station for a cellular radio system.

To obtain this type of interference protection, a frequency repeat (or reuse) pattern is established such that the co-channel frequencies are assigned to sites that are spaced apart with several sites in between. For example, based on a statistical model of a small cell radio system, to obtain a 17–20 dB minimum C/I over 90% of the cell area, a 16 cell co-channel reuse pattern (such as illustrated by cell plan 500 of FIG. 5) is required, assuming various channel properties and assumptions relating to the environment type. This means that in a group of 16 adjacent cells, a given frequency is used only one time. This is conventionally represented by a hexagonal cellular pattern in which there are three cells in between each co-channel site on each sixty degree axis from the given site. In practice, for very large cells that are on tall towers, these types of patterns work relatively well. For small cell systems however, where there could be thousands of sites, and where the coverage is not as well defined, due to the propagation effects between buildings, and due to foliage and trees, the repeat pattern becomes difficult to determine, and the size and shapes of the cells become quite irregular.

Due to the difficulty in laying out such a system of cells, and providing for the required interference protection from the co-channel signals from other cells, an automated approach has been proposed called Quasi Static Autonomous Frequency Assignment (QSAFA). In the QSAFA approach, each base station takes itself out of service at a pseudo random time within a predetermined maintenance window, typically early in the morning when the cell is not being used. When the base is removed from service, it switches its receiver from the normal reverse link (subscriber to base) frequency band to the forward link (base to subscriber) frequency band, and scans all the possible base transmit frequencies and makes and stores power measurements in memory. Thus, the base which is performing QSAFA is measuring the power of signals received from other bases. Once the power measurements are made and recorded in computer memory, the signal with the smallest power level is selected, and the base transmit frequency that is represented by that selection is now used by the measuring base station until the next QSAFA cycle is initiated. Each base station follows the same process and selects its own frequency assignment when its QSAFA time is indicated. The results from this type of process vary and the repeat pattern is generally not uniform (as illustrated by pattern 600 in FIG. 6).

While the QSAFA system may work well in most cases, there are a number of special problems that could cause the decision made by the proposed QSAFA process to be in error, and this could place a few cells whose QSAFA decision was poor in a nearly in-operable situation. These problems arise mainly as a result of measurements of the power received from other base stations to represent the "design rules" for separating the base stations. When the signal is faded due to multi-path propagation for example, the signal received at the base performing the QSAFA measurements could be in error by up to 20 dB. For example, if the channel is assumed to exhibit Rayleigh fading, and a selection diversity using two independent branches is used at the base station, a fade of 10 dB would occur 1% of the time, on average, and a 20 dB fade would occur 0.01% of the time. This may not sound that significant for normal radio channels, but for QSAFA measurements a 10 dB error in estimating the signal power received from a nearby base makes that base "appear" to be 10 dB further away, making an assignment to that base's frequency possible. This would be a bad decision since any subscriber unit using this base's frequency will not be protected the 10 dB error (they are not subject to the same propagation, shadowing, etc.), and their interference level will suffer.

A second problem, which could give rise to more than 10–20 dB of degradation in the measurement is the case of two base sites that are placed on opposite sides of a building (See FIG. 8). Since the diffraction paths around the building represent many dB of attenuation, perhaps 40 dB or more, there may be up to a 40 dB mistake in reading the power from each base during the QSAFA measurement process. Although other nearby bases may not be "shadowed" or "blocked" from each other to this extent, the shadowing of these two bases could easily cause them to choose the same frequency of operation since they are essentially "blind" to each others presence.

Finally, a third problem of the conventional QSAFA approach is shown by the case when two units randomly perform a QSAFA measurement at the same time. When two bases do so, they will not "see" each other (since neither is transmitting), and may end up choosing the same frequency for operation.

Each of the potential problems listed here could produce the undesired result of a base station choosing a frequency of a nearby base, and in most cases, since the paths are reciprocal, each base will likely come to the same determination. The worst case scenario, possible under conventional QSAFA, is for a base station located adjacent to a second base station to choose a common frequency assignment. In this case, the C/I ratio could approach 0 dB in much of the cell, even though one or both base stations would have chosen what they believe to be the best assignment according to the QSAFA process. The present invention solves these and other problems by improving the decision process, and in particular avoids the worst of having the co-channel assignments made to adjacent cells.

BRIEF DESCRIPTION OF THE DRAWINGS

FIG. 9 is a block diagram of a second embodiment according to the invention, a hardware implementation having a common database shared between base sites.

DETAILED DESCRIPTION OF THE DRAWINGS

These problems are solved by an improved method according to the invention. A presently preferred embodiment of the invention is the method including: first applying the QSAFA process to an initial deployment of base stations to obtain a first frequency assignment for each base. Then during normal operation each base station (or its controller unit), including a first base station, generates and updates a table for each subscriber handoff in which a subscriber is transferred to or from the first base station. Once this list is generated, having a minimum number of entries for each base, the list is used to identify the nearby base stations which are valid handoff candidates. This determination is then used during the frequency assignment process, in which the first base station is assigned one of the available frequencies by the QSAFA process but not one associated with (e.g., not an interferer with) these nearby base stations. In addition, a modification may be made to the measured values of the residual power for each measured frequency that is measured prior to the completion of the frequency assignment process. This modification biases the measured power to scale the output by a predetermined amount when the table of valid handoff candidates includes adjacent channel frequencies to the frequency being tested. A second bias of a predetermined amount may be added when the table of handoff candidates includes base sites which include co-channel frequencies in their list of valid handoff candidates. Thus, the use of the derived list of nearby handoff candidate base stations is used to prevent a frequency assignment that might otherwise be selected due to one of several known deficiencies with the QSAFA process.

Figure 1:
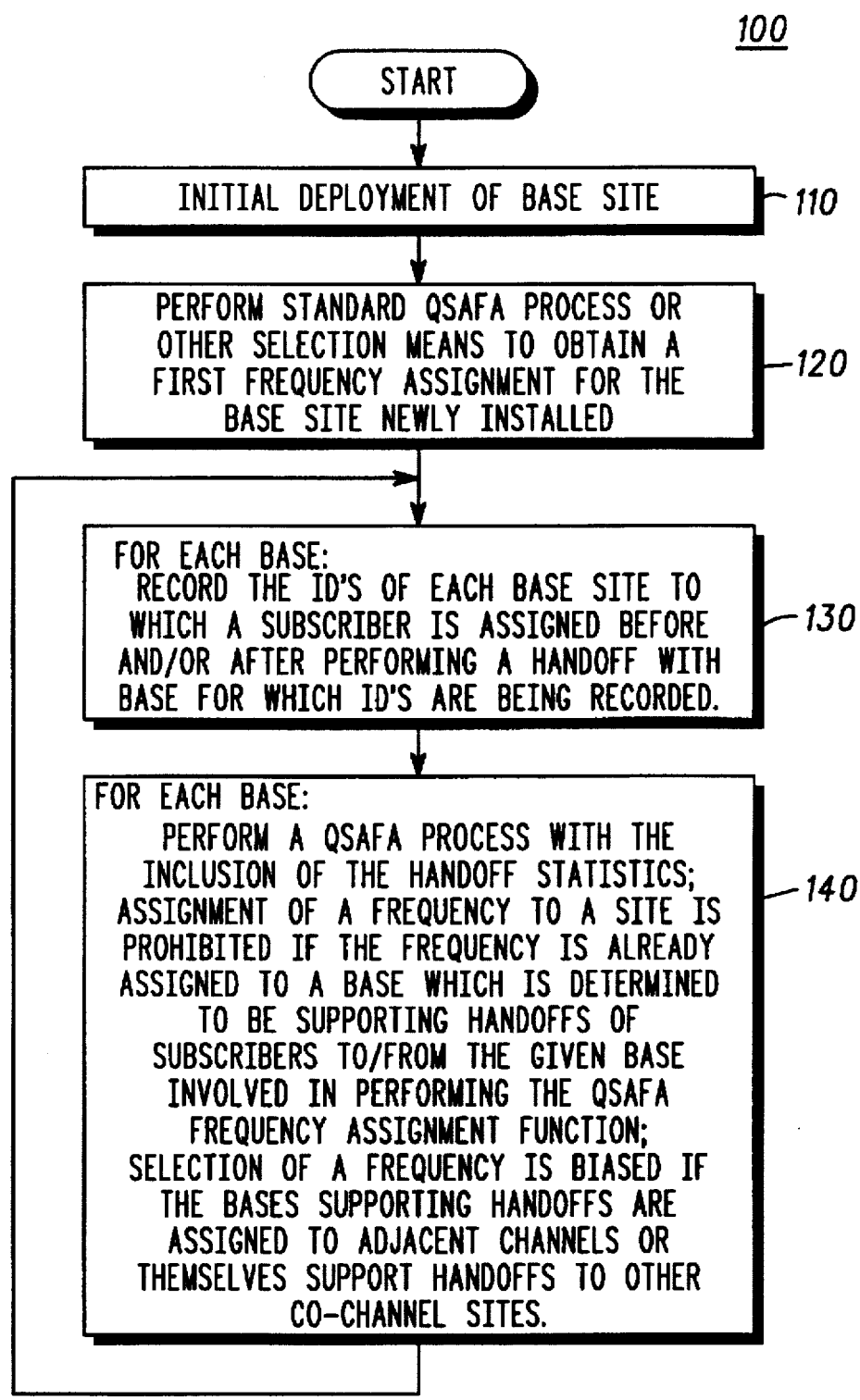
FIG. 1 is a flow chart illustrating an overview of a first embodiment process according to the invention.

Turning then to FIG. 1, a block diagram of a flow chart illustrating a first process, generally designated 100, embodying the present invention is shown. Process 100 starts at block 110 when a base station is deployed into a cellular radio system.

At the time the radio transmitter or base station is deployed, its frequency assignment must be assigned for the first time. This assignment is indicated in block 120 by preferable performing a QSAFA process, more completely described in FIG. 2. If desired, this initial frequency assignment could be chosen manually by an operator, or by the use of another frequency selection process without affecting the invention presented herein. Block 120 functions only to have an initial assignment from which to begin service, and facilitate further measurements from which an improved frequency assignment decision can be obtained according to the invention.

In block 130, each base records (1) the identifications (IDs) of other base stations which are involved in supplying service to a subscriber unit before transferring service to said base or (2) the IDs of other base stations which are involved in supplying service to a subscriber unit after service is transferred from said base to another base. Each time a subscriber unit is handed into or out of service at the said base, the ID of the other base is recorded. This recorded information preferably includes a time of occurrence, which could include a date. The processing of block 130 is further described in FIG. 3.

At the time the base station is required to perform a frequency assignment processing process, as illustrated in block 140, an improvement to the standard QSAFA process is implemented. This block is further described in FIG. 4.

Figure 2:
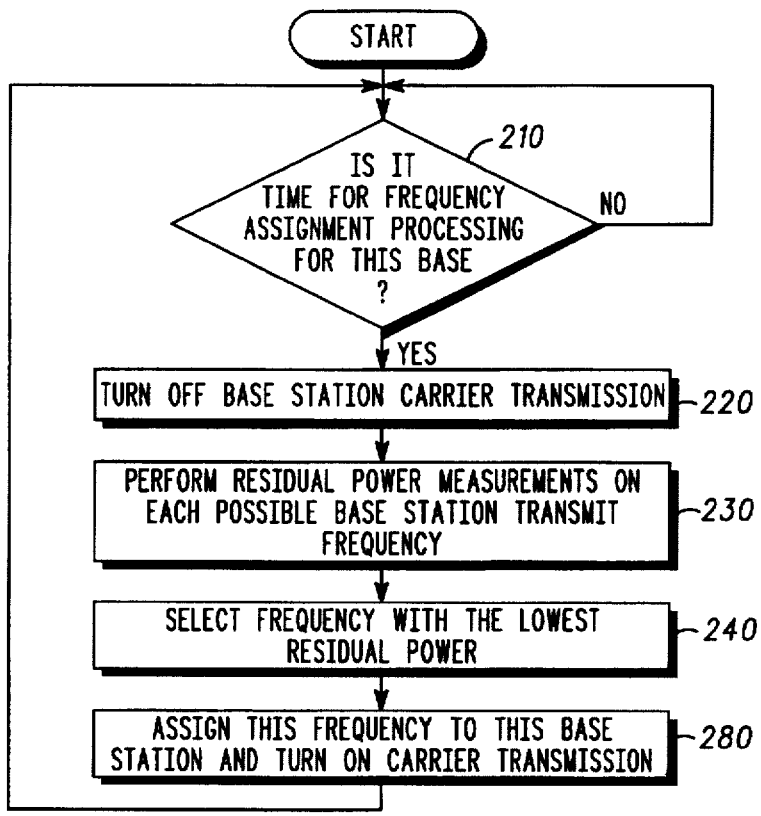
FIG. 2 is a flow chart illustrating a prior art QSAFA process.

Referring to FIG. 2, a flow chart is shown illustrating a Prior Art process, generally designated 120, describing a conventional Quasi Static Autonomous Frequency Assignment (QSAFA) process. This process is performed at each base station, at a time each base chooses. Typically this is at night when there is little or no usage so as to avoid service disruptions. The process begins at decision block 210, when the decision to begin the QSAFA process is made. When activated, in block 220 the base transmission is turned off. The receiver then scans all available (i.e. assignable) frequencies in block 230 to measure the power on each of the pre-assigned base transmit frequencies. This measured power is called a residual power level since it is the composite of all the signals from as many other bases in various locations transmitting at the frequency being measured. Once the measurements are complete, block 240 selects the frequency with the lowest power reading of all the measured frequencies. This represents the channel with the lowest received power at the base antenna of the site performing the QSAFA process. The frequency with the lowest power is then assigned to this base station, block 280, and the base adjusts its transmitter frequency to this frequency assignment and turns on its carrier, returning to normal service. This completes the QSAFA process.

Figure 3:
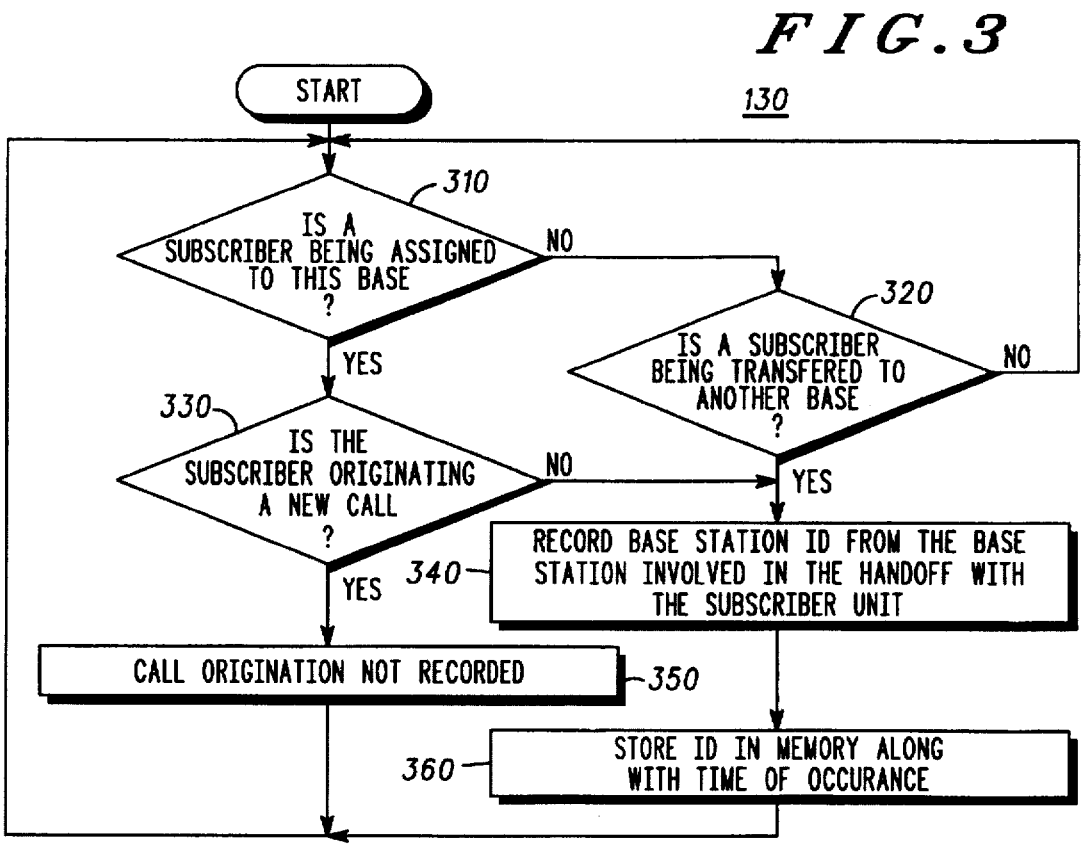
FIG. 3 is a flow chart illustrating an ID recording process of the embodiment of FIG. 1.

Referring to FIG. 3, a flow chart is shown describing the recording process 130 at a base station/controller according to the invention. The process begins at block 310, which tests to see if a subscriber is being assigned to the base. If this is true, a further test is made, 330, to see if the subscriber is making a new call, or if a handoff is being made to the base from another cell. If it is a new call, the process is continued in block 350, which returns the recording process back to the start without recording any data. If the call was handed into the base as determined in block 330, then block 340 is processed. If the decision in block 310 did not identify a subscriber being assigned to this base, a second test, block 320, is performed to test if a subscriber is leaving this base to be served by another base. If so, the process is transferred to block 340, otherwise it returns to the beginning. Block 340 records the ID of the base station which supplies service to the subscriber unit prior to its handoff to this base if the subscriber was handed to this base, or it records the ID of the base station which supplies service to the subscriber unit after it leaves this base by handing off to the new base. The ID recorded in this block is stored in memory in block 360 along with the time and date of the occurrence. When block 360 is complete, the process is transferred to the beginning.

Figure 4:
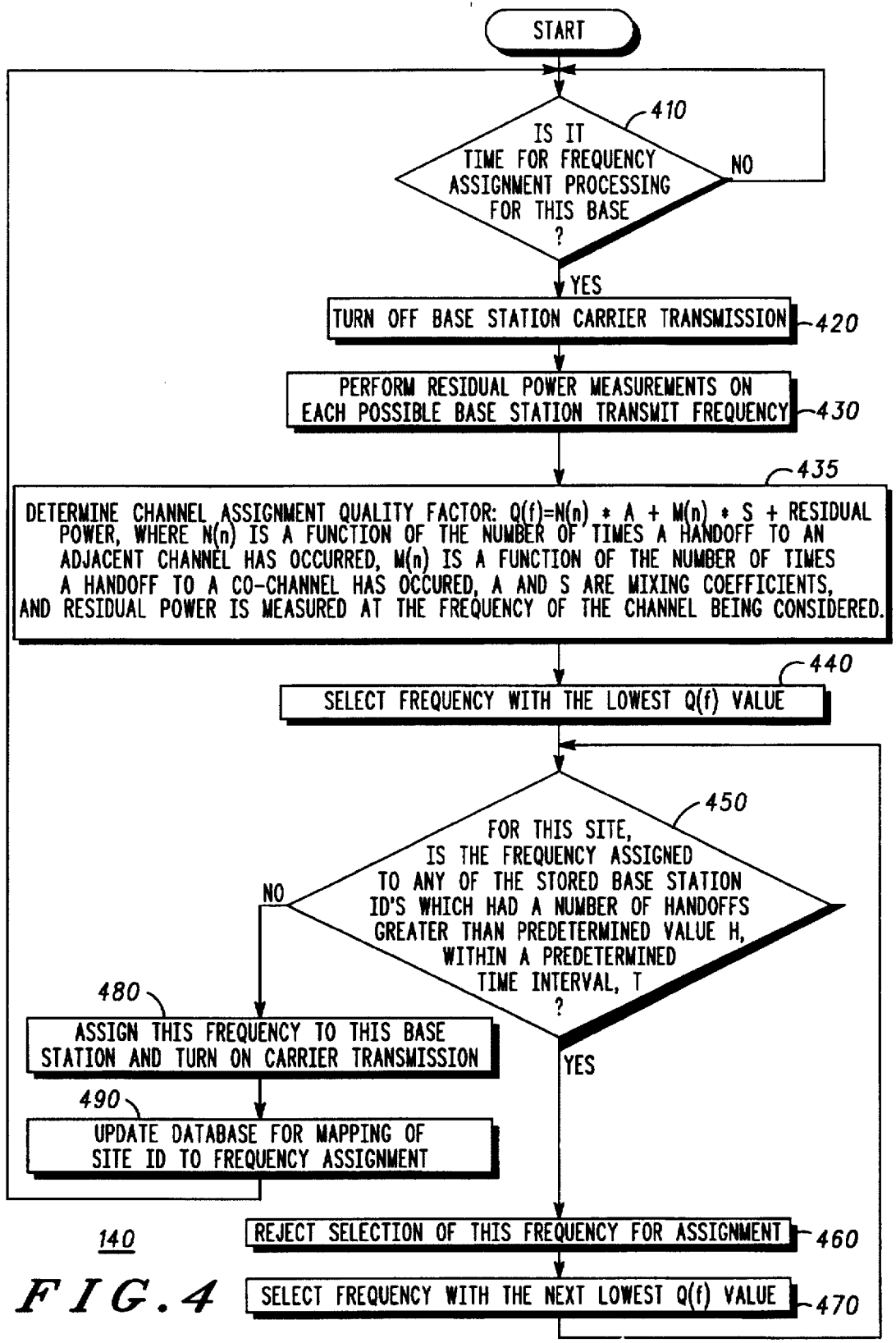
FIG. 4 is a further flow chart illustrating the embodiment of FIG. 1.

In FIG. 4, a further flow chart illustrating an embodiment of the improved process, generally designated 140, according to the present invention is shown. Decision block 410 starts the process when the time for the frequency assignment process has arrived. The time to begin the process is preferably predetermined within a given time window, and the actual time is selected based on traffic loading and a random timer to help randomize the performance of the improved QSAFA process. Once the process begins, 420, the Base station is removed from service, and its carrier is turned off. The receiver then scans the available frequencies in block 430 to measure the power on each of the pre-assigned base transmit frequencies. This measured power is called a residual power level since it is the composite of all the signals from many other sites in various locations at the frequency being measured.

Once the measurements are complete, block 435 generates a calculated Q(f) (frequency quality parameter) for each frequency. This Q(f) function is represented by the equation Q(f)=N(n)*A+M(n)*S+residual power. In this equation, N(n) and M(n) are predetermined constants defined for each value of n, where n=0,1,2,3 ... with n generally less than 10. N(n) represents a predefined scaling term that is a function of n, the number of occurrences of an event (in the case of N(n), the detection of an adjacent channel frequency assigned) at the base stations which had a number of handoffs to/from the first base greater than a predetermined value H, within a predetermined time interval, T. The term A represents a fixed constant, predefined so as to appropriately weight the N(n) term for the decision. Thus the term N(n)*A will bias the function Q(f) based on the detection of adjacent channel sites for frequency f, which are being used to supply handoffs to or from the site processing a frequency assignment decision. The term M(n) represents a predefined scaling term that is a function of the number of occurrences of the detection of sites assigned a co-channel interfering frequency and which are either a primary site which supports handoffs with the first base and had a number of handoffs greater than a predetermined value H within the predetermined time interval T, or a secondary site which supports handoffs with a primary site and had a number of handoffs grater than the predetermined value H within the predetermined time interval T. The term S represents a fixed predefined constant, similar to that of A. Thus the term M(n)*S will bias the function Q(f) based on the detection of sites involved in handoffs with the said base and other bases using the same frequency. Therefore, by adjusting the scaling constant A, the process can be adjusted to reject or ignore the effects of the adjacent channel assignment of the frequency. By adjusting the scaling constant S, the process can be adjusted to reject or ignore the effects of the mutual co-channel assignment of the frequency. To ignore these effects, the terms A or S can be set to zero. To reject all cases of these events, the terms A or S could be set to a very large number. In this latter case, even a single occurrence will produce a huge offset and the Q(f) function will become very large, thereby removing the frequency from consideration by placing it close to the bottom of the list of possible frequencies. A value for A or S between zero and the very large number will cause a shift in the resulting Q(f) function which will cause other frequencies with better Q(f) functions to be considered first.

After the Q(f) function is calculated, block 440 selects the lowest Q(f) (i.e., Q(f) is an inverse channel assignment quality factor) reading for testing. This represents the channel with the lowest received power at the base antenna of the site performing the QSAFA process. In decision block 450, the channel with the lowest residual power level is tested to see if it is the same frequency as used by base sites with which there are a significant number of handoffs within a recent time period. This is done by accessing the base station IDs which had a number of handoffs greater than a predetermined threshold value H, within a time interval defined by a threshold value T. The time interval represents the most recent samples stored in time. Although the threshold values H and T are described here as constants, these values could also be functions of other variables (such as the traffic density in the cell and its variability based on day of week, or the time since new cells have been added to the system, or the frequency of updating the frequency plan of each cell, or other statistical parameters collected by the cells representing interference, dropped calls, completed calls, or degraded calls), and such a modification is within the scope of the invention, and may be implemented by a skilled artisan. If decision block 450 does not pass the frequency selection with the lowest residual power, this frequency is withdrawn, 460, and the frequency with the next lowest Q(f) is selected, 470, for testing in decision block 450. When decision block 450 identifies a frequency with a low residual power level which is not used for handoffs by subscriber units to any significant level such as defined by the thresholds, the process in block 480 is activated. This block assigns the selected frequency to the base station and turns on the carrier. Block 490 then updates a common database which maps the site IDs of the various bases to the frequency assignments that they currently have. Thus the data obtained from other sites recording handoff statistics will be up to date for use in their own frequency assignment decisions.

It should be appreciated that the above process can be equally applicable to multi-frequency assignments. Thus, if the base station is using two or more frequencies (such as would be the case in cellular radio systems), the lowest two (or more) frequencies could be determined in step 430, and the selected frequencies tested in steps 435–450, with steps 460–470 being performed only for those frequencies which do not pass the selection process in step 450. In the alternative, the selection process could proceed serially for each channel to be assigned a frequency, or even serially among the base stations (first assigning one (or more) frequencies at each base site, then repeating the process for a next set of channels).

Figure 5:
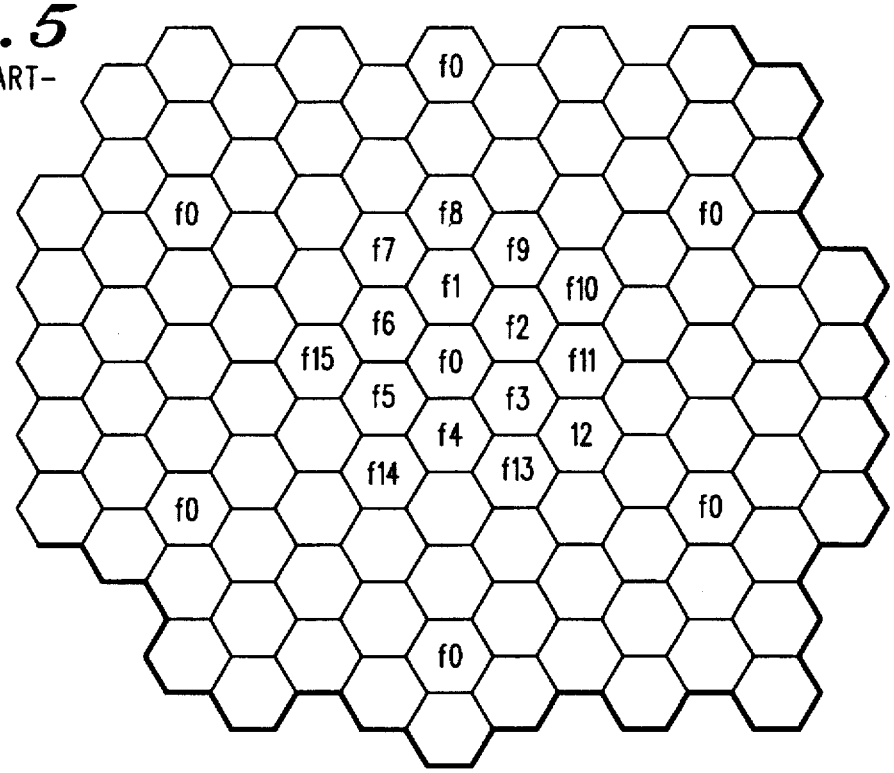
FIG. 5 is a prior art diagram illustrating a typical cellular layout in which a given frequency is re-used every 16 sites.

FIG. 5 is a prior art diagram, generally designated by 500. This diagram shows a representation of a cellular site layout using a hexagonal grid. The frequency f0 is shown in a 16 cell reuse pattern. This can be seen by the spacing between each site with the f0 designation having three other sites between them, one pattern of cells being shown using frequencies f0 through f15.

Figure 6:
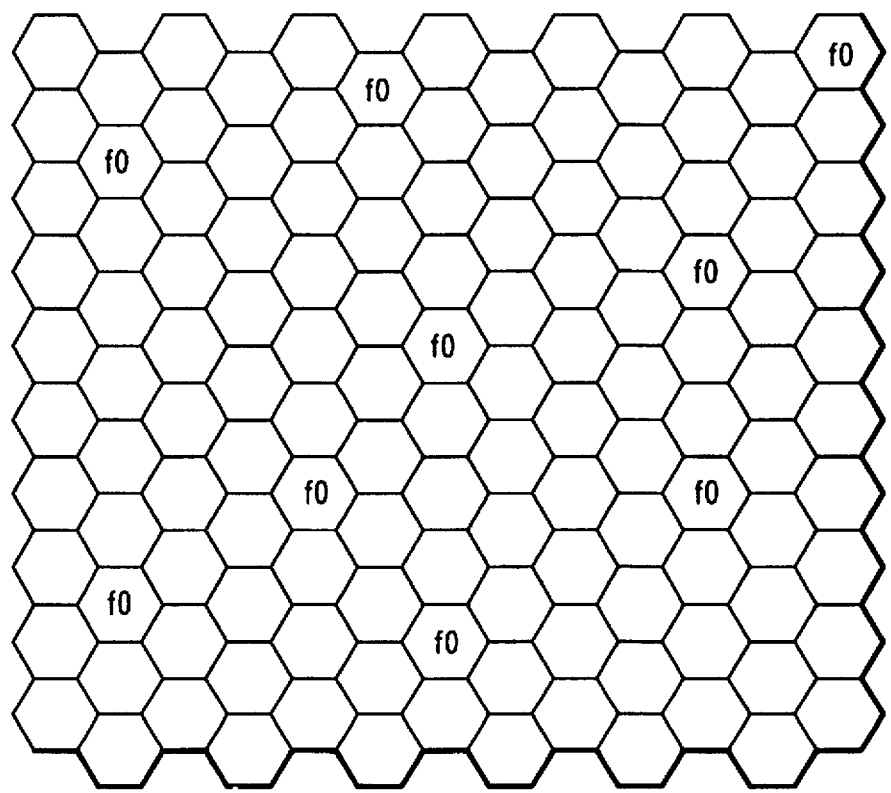
FIG. 6 is a prior art diagram illustrating one possible arrangement of co-channel sites after a QSAFA process has been used to assign the frequencies.

FIG. 6 is a prior art diagram, generally designated by 600. This diagram shows a non-uniform cell reuse pattern which represents one possible assignment generated by a conventional QSAFA process being performed at each base station. The non-uniform pattern is due to environmental effects on the signal propagation between the various sites. Since there will be various levels of attenuation due to foliage, buildings, multipath propagation, and diffraction, the signals will have different attenuations along every path. Thus by making the best decision possible, the QSAFA process will still not be able to lay out a cellular system reuse pattern as well as other methods. In some cases, the repeat of the frequency designated as f0 could be in an adjacent cell, which would produce outages in both adjacent co-channel sites.

Figure 7:
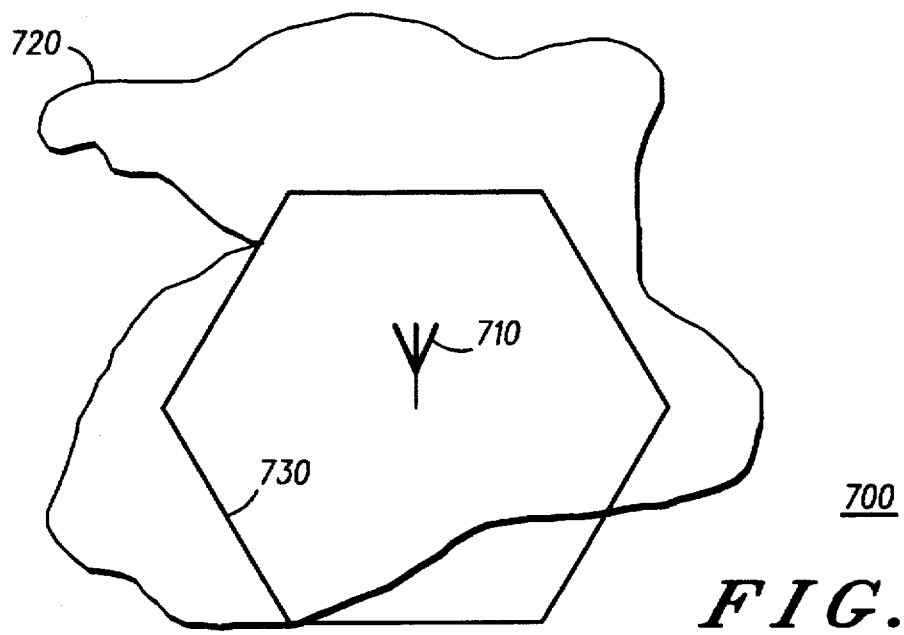
FIG. 7 is a prior art diagram illustrating a possible coverage area of a transmitter compared to an idealized hexagonal coverage area.

FIG. 7 is a prior art diagram, generally designated by 700. In this diagram, a hexagonal cell is represented by 730. This is an ideal model of a cell, but is not well suited for modeling small microcells, particularly when the antenna is below the building or foliage clutter. The actual coverage, depicted by 720, is much different. This illustrates the effect of the variations in the path and the effects of buildings and foliage on the signal.

Figure 8:
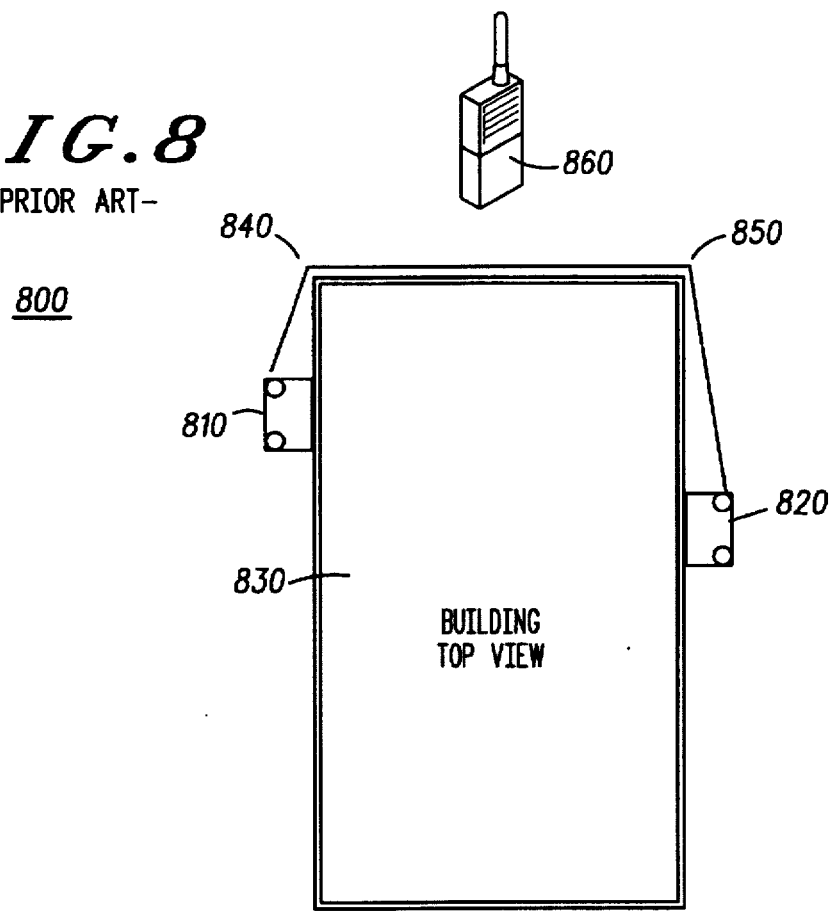
FIG. 8 is a diagram illustrating a potential problem with the prior art caused by the propagation effects around the sides of a building.

FIG. 8 is a prior art diagram, generally designated by 800. In this diagram, two different base stations, 810 and 820, are mounted on the same building, 830 with no other buildings nearby. This hypothetical situation illustrates how two base stations could choose the same frequency since the path between these two base stations is impacted by two diffraction corners, 840 and 850. This will attenuate the signal from 40 to 60 dB, making the path between bases 810 and 820 to appear much further apart. However, a subscriber unit 860 that is near either end of the building will see nearly equal signal strengths from both base stations.

FIG. 9 depicts a hardware layout of a communications system according to an embodiment of the invention, generally designated as 900. The system illustrated is part of a PCS (personal communications system) infrastructure, but is equally applicable to other wireless communications systems including cellular radiotelephony and wireless LAN (local area network). The system includes plural communication units, or base stations or radio ports (RPs), 931 through 937, operating in plural base sites 921–927, respectively. Each RP 931–937 is coupled to a base station controller unit 950 (an RPCU, or radio port controller unit for a PCS system). Each of the RPs 931–937 includes a transceiver (e.g., 938 of RP 931); as will be appreciated, only the receiver portion of transceiver 938 will be active since the transmitter is not on during QSAFA measurements. Rather, RP 931 will be scanning and measuring a signal quality measure (e.g., power or RSSI) of each of the set of frequencies available, a subset of which will be transmitted by RPs 932–937 (shown as signals 942–947) while RP 931 is scanning. The power measurements are then forwarded to RPCU 950 for further processing in processor 952, in accordance with the processes described above in connection with FIGS. 1–4. In particular, the channel assignment quality factor (e.g., the inverse of Q(f)) is determined by function 955 of processor 952 based on previously stored records of the prior communications events (e.g., handoffs between RPs 931–937) in memory 960 within the set window period of time. The frequency with the greatest signal quality measure is also determined by function 956 (in the alternative, one or both functions 955–956 could be determined in processor 939 of RP 931, with appropriate handoff information retrieved via RPCU 950). If, for this frequency, the channel assignment quality factor is above a predetermined quality threshold, a determination is outputted and controller 954 assigns this frequency for use by RP 931. This process is repeated for all the RPs 932–937. One skilled in the art will appreciate that any number of RPs may be coupled to RPCU 950, and that information from RPs that are only indirectly coupled to RPCU 950 (e.g., RPs connected to a different RPCU, which in turn is coupled to RPCU 950) may also be used in determining and assigning a frequency in accordance with the invention.

Thus, it will be apparent to one skilled in the art that there has been provided in accordance with the invention, a method and apparatus for assigning a frequency to a base station of a wireless communication system that fully satisfies the objectives, aims, and advantages set forth above.

While the invention has been described in conjunction with specific embodiments thereof, it is evident that many alterations, modifications, and variations will be apparent to those skilled in the art in light of the foregoing description. Accordingly, the invention is intended to embrace all such alterations, modifications, and variations within the spirit and scope of the appended claims.

We claim:

1. A method of assigning a channel to a first communication unit of plural communication units comprising the steps of:
   (a) scanning a set of channels and determining a signal quality measure of each channel of the set of channels;
   (b) determining a channel assignment quality factor for each channel of the set of channels based, at least in part, upon the signal quality measure and data representing handoffs to or from another of the plural communication units using that channel; and
   (c) assigning a channel of the set of channels having the best channel assignment quality factor as a channel of the first communications unit.

2. The method of claim 1, wherein in step (b) the channel assignment quality factor is determined by the inverse of the sum of P and at least one from the group consisting of $(A*N(n))$ and $(S*M(n))$, wherein:
   (i) $N(n)$ is determined from a measure of the plural communication units having (a) greater than a first predetermined threshold of handoffs with the first communication unit within a first time interval and (b) an adjacent channel of the channel scanned;
   (ii) $M(n)$ is determined from a measure of the plural communication units having (a) greater than a second predetermined threshold of handoffs with the first communication unit within a second time interval and (b) a same channel as the channel scanned;
   (iii) A is a first weighting factor and S is a second weighting factor; and
   (iv) P is a measure of power of the channel scanned, wherein the measure of power is the signal quality measure.

3. The method of claim 2, wherein the first predetermined threshold of handoffs is the same as the second predetermined threshold of handoffs, and the first time interval is the same as the second time interval.

4. The method of claim 2, further comprising prior to step (b) storing a record of each handoff among the plural communication units, each record including an identification of each one of the plural communication units involved and a time of handoff.

5. The method of claim 1, wherein in step (b) the step of determining the channel assignment quality factor comprises determining which ones of the plural communication units is transmitting on the channel scanned, and determining from a record of prior communication events which of said ones of the plural communication units have above a predetermined threshold number of said prior communication events.

6. The method of claim 5, wherein the step of determining from a record comprises determining from a record of prior handoffs which of said ones of the plural communication units have above a predetermined threshold number of handoffs with the first communication unit within a first period of time.

7. The method of claim 6, wherein the step of determining the channel assignment quality factor further comprises determining from the record of prior handoffs which of said ones of the plural communication units have above a predetermined threshold number of handoffs with a further communication unit adjacent to the first communication unit within the first period of time.

8. The method of claim 1, wherein in step (b) the step of determining the channel assignment quality factor comprises determining which ones of the plural communication units is transmitting on a channel adjacent to the channel scanned, and determining from a record of a plurality of prior communication events which of said ones of the plural communication units participated in above a predetermined threshold number of said plurality of prior communication events.

9. The method of claim 8, wherein the step of determining from a record comprises determining from a record of prior handoffs which of said ones of the plural communication units have above a predetermined threshold number of handoffs with the first communication unit within a first period of time.

10. The method of claim 9, wherein the step of determining the channel assignment quality factor further comprises determining from the record of prior handoffs which of said ones of the plural communication units have above a predetermined threshold number of handoffs with a further communication unit adjacent to the first communication unit within the first period of time.

11. The method of claim 1, wherein step (c) further comprises, when the channel assignment quality factor for the channel scanned is less than the predetermined quality threshold, repeating step (b) for a next channel scanned having the next-greatest signal quality measure, and assigning the next channel scanned if the channel assignment quality factor for the next channel scanned is greater than the predetermined quality threshold.

12. The method of claim 1, wherein step (b) further comprises comparing the signal quality measure of each one of the set of channels and determining which of said each one of the set of channels is the channel scanned having the greatest signal quality measure.

13. The method of claim 1, wherein step (a) further comprises first stopping all transmissions by the communication unit, and then scanning the set of channels, wherein the set of channels is all channels available for use in transmission by the communication unit and the signal quality measure is the power, and determining the power of all said channels available for use in transmission.

14. A communications system, including plural communication units, operable for assigning a channel to a first communication unit of the plural communication units, comprising:

(a) means for scanning a set of channels and determining a signal quality measure of each channel of the set of channels;

(b) means for determining a channel assignment quality factor for each channel of the set of channels, the channel assignment quality factor being based, at least in part, upon the signal quality measure and data representing handoffs to or from another of the plural communication units using that channel; and (c) means for assigning a channel of the set of channels as a channel of the first communication unit based upon the channel assignment quality factor.

15. The system of claim 14, wherein the means for determining is further operable for determining the channel assignment quality factor from the inverse of the sum of P and at least one from the group consisting of $(A*N(n))$ and $(S*M(n))$, wherein:

(i) $N(n)$ is determined from a measure of the plural communication units having (a) greater than a first predetermined threshold of handoffs with the first communication unit within a first time interval and (b) an adjacent channel of the channel scanned;

(ii) $M(n)$ is determined from a measure of the plural communication units having (a) greater than a second predetermined threshold of handoffs with the first communication unit within a second time interval and (b) a same channel as the channel scanned;

(iii) A is a first weighting factor and S is a second weighting factor; and (iv) P is a measure of power of the channel scanned, wherein the measure of power is the signal quality measure.

16. The system of claim 15, wherein the means for determining further comprises a means for storing a record of each handoff among the plural communication units, the record including an identification of each one of the plural communication units involved and a time of handoff.

17. The system of claim 16, wherein the plural communication units are each base stations, the first communication unit is a first base station, the means for scanning is a receiver of the first base station, the means for determining is a processor of a first control unit, the first control unit being operably coupled to each of the base stations, with the means for assigning being a controller coupled to the processor and the means for storing being a memory coupled to the processor.

18. The system of claim 14, wherein the means for determining is further operable for, when the channel assignment quality factor for the channel scanned is less than the predetermined quality threshold, determining the channel assignment quality factor for a next channel scanned having a next-best signal quality measure, and the means for assigning is further operable for assigning the next channel scanned if the channel assignment quality factor for the next channel scanned is greater than the predetermined quality threshold.

19. The system of claim 14, wherein the means for scanning is further operable for first stopping all transmissions by the communication unit, and scanning the set of channels, wherein the set of channels is a plurality of channels available for use in transmission by the communication unit and the signal quality measure is a received signal strength indication (RSSI), and determining the RSSI of all said channels available for use by the first communication unit.

20. A communications system, including plural base stations, operable for assigning a channel to each base station of the plural base stations, comprising:

(a) a first base station of the plural base stations comprising a receiver operable for scanning a set of channels and determining a signal quality measure of each one of the set of channels, and outputting the determined signal quality measures; and (b) a base station controller unit coupled to the plural base stations comprising:

(i) a memory operable for storing a record of each handoff among the plural base stations, each record including an identification of each one of the plural base stations involved and a time of handoff;

(ii) a processor coupled to the memory, operable for receiving the determined signal quality measures and determining, for a first channel having the greatest signal quality measure, a channel assignment quality factor based upon the records of handoffs and for comparing the channel assignment quality factor with a predetermined quality threshold; and (iii) a controller, coupled to the processor, for assigning the first channel for use by the first base station if the channel assignment quality factor is greater than the predetermined quality threshold.

* * * * *